(12) United States Patent
Huh et al.

(10) Patent No.: US 10,826,897 B2
(45) Date of Patent: Nov. 3, 2020

(54) METHOD AND APPARATUS FOR AUTHENTICATION OF USER USING BIOMETRIC

(71) Applicants: ELECTRONICS AND TELECOMMUNICATIONS RESEARCH INSTITUTE, Daejeon (KR); YONSEI UNIVERSITY, UNIVERSITY-INDUSTRY FOUNDATION (UIF), Seoul (KR)

(72) Inventors: Seyoung Huh, Daejeon (KR); Andrew Beng Jin Teoh, Seoul (KR); Jung Yeon Hwang, Daejeon (KR); Seok Hyun Kim, Daejeon (KR); Soo Hyung Kim, Daejeon (KR); Seung-Hyun Kim, Daejeon (KR); Youngsam Kim, Daejeon (KR); Jong-Hyouk Noh, Daejeon (KR); Sangrae Cho, Daejeon (KR); Young Seob Cho, Daejeon (KR); Jin-Man Cho, Daejeon (KR); Seung Hun Jin, Daejeon (KR)

(73) Assignees: ELECTRONICS AND TELECOMMUNICATIONS RESEARCH INSTITUTE, Daejeon (KR); YONSEI UNIVERSITY, UNIVERSITY-INDUSTRY FOUNDATION (UIF), Seoul (KR)

( * ) Notice: Subject to any disclaimer, the term of this patent is extended or adjusted under 35 U.S.C. 154(b) by 249 days.

(21) Appl. No.: 16/016,822

(22) Filed: Jun. 25, 2018

(65) Prior Publication Data
US 2018/0375859 A1    Dec. 27, 2018

(30) Foreign Application Priority Data
Jun. 26, 2017    (KR) .................. 10-2017-0080752

(51) Int. Cl.
*G06F 21/00*      (2013.01)
*H04L 29/06*      (2006.01)
(Continued)

(52) U.S. Cl.
CPC .......... *H04L 63/0861* (2013.01); *G06F 21/32* (2013.01); *G06K 9/00926* (2013.01);
(Continued)

(58) Field of Classification Search
CPC . H04L 63/0861; H04L 9/0869; H04L 9/0894; H04L 9/3231; G06F 21/32; G06K 2009/00953
See application file for complete search history.

(56) References Cited

U.S. PATENT DOCUMENTS 8,239,685 B2    8/2012  Lee et al.
9,455,984 B2    9/2016  Jo et al.
(Continued)

FOREIGN PATENT DOCUMENTS

KR    10-1604539 B1    3/2016

OTHER PUBLICATIONS

Yen-Lung Lai et al., "Fingerprint Cryptosystem Using Cancellable b-Band Mini Vaults Construction".
(Continued)

*Primary Examiner* — John B King
*Assistant Examiner* — Darshan I Dhruv
(74) *Attorney, Agent, or Firm* — LRK Patent Law Firm

(57) ABSTRACT

A method and an apparatus for authenticating user using biometric information. The apparatus authenticates the user by performing: generating a first feature vector from first biometric information of the user obtained by the biometric sensor and multiplying the first feature vector by a plurality of pseudo-random number (PRN) matrices, respectively; generating a query template based on an index of an element
(Continued)

having a maximum value among elements of a result vector of the multiplication between the first feature vector and the plurality of PRN matrices; and performing authentication for the user by comparing the query template with a pre-stored reference template of a subscribed user.

18 Claims, 6 Drawing Sheets

(51) Int. Cl.
    *G06F 21/32*     (2013.01)
    *H04L 9/08*     (2006.01)
    *G06K 9/00*     (2006.01)
    *H04L 9/32*     (2006.01)

(52) U.S. Cl.
    CPC .......... *H04L 9/0869* (2013.01); *H04L 9/0894* (2013.01); *H04L 9/3231* (2013.01); *G06K 2009/00953* (2013.01)

(56) References Cited

U.S. PATENT DOCUMENTS

| | | | | |
|---|---|---|---|---|
| 9,928,379 | B1* | 3/2018 | Hoffer | G16H 50/70 |
| 2005/0084143 | A1* | 4/2005 | Kramer | G06K 9/00114 |
| | | | | 382/125 |
| 2008/0065900 | A1 | 3/2008 | Lee et al. | |
| 2009/0271634 | A1* | 10/2009 | Boult | H04L 9/3231 |
| | | | | 713/186 |
| 2009/0310779 | A1* | 12/2009 | Lam | G06K 9/00093 |
| | | | | 380/46 |
| 2011/0091113 | A1* | 4/2011 | Ito | G06K 9/00315 |
| | | | | 382/197 |
| 2012/0207299 | A1* | 8/2012 | Hattori | H04L 9/3073 |
| | | | | 380/30 |
| 2013/0262489 | A1* | 10/2013 | Shirakawa | G06F 16/24558 |
| | | | | 707/756 |
| 2014/0258718 | A1* | 9/2014 | Isakow | H04L 63/0435 |
| | | | | 713/165 |
| 2014/0281569 | A1* | 9/2014 | Takahashi | G06F 21/32 |
| | | | | 713/186 |
| 2014/0354405 | A1* | 12/2014 | Kocher | G06F 21/32 |
| | | | | 340/5.82 |
| 2015/0169936 | A1* | 6/2015 | Ivanov | G06K 9/00577 |
| | | | | 382/124 |
| 2015/0304320 | A1* | 10/2015 | Jo | G06K 9/00885 |
| | | | | 713/171 |
| 2016/0034821 | A1* | 2/2016 | Konoshima | G06F 16/2462 |
| | | | | 706/52 |
| 2017/0317831 | A1* | 11/2017 | Keuffer | G06F 21/32 |

OTHER PUBLICATIONS

Zhe Jin et al., "A New and Practical Design of Cancellable Biometrics: Index-of-Max Hashing".

* cited by examiner

METHOD AND APPARATUS FOR AUTHENTICATION OF USER USING BIOMETRIC

CROSS-REFERENCE TO RELATED APPLICATION

This application claims priority to and the benefit of Korean Patent Application No. 10-2017-0080752, filed in the Korean Intellectual Property Office on Jun. 26, 2017, the entire content of which is incorporated herein by reference.

BACKGROUND OF THE INVENTION

1. Field of the Invention

The present disclosure relates to a method and an apparatus for authenticating user using biometric information.

2. Description of Related Art

Generally, identification or authentication of individuals is a major question that an administrator of a computer system must perform before any type of transaction is allowed. User identification systems and memory-dependent password-based authentication systems that are currently available may be inexpensive, readily implemented, and supported by many other systems. However, such prior system does have certain disadvantages and these disadvantages have been widely recognized among the industry practitioners. Among them, the password may be easily copied and distributed. Often, with the user identification and password system, the user will forget their password resulting in many inconveniences to the user and the system administrator.

There are devices and method for protecting information and property from unauthorized access. For example, there are a smart card system, a magnetic key, and a magnetic strip card. However, these systems also have their own weaknesses that limit their widespread applications.

Biometrics may provide an exciting potential in a field of a human anatomy, a behavioral measurement of humans, and human characteristics. The main advantage of biometric authentication is that it recognizes individuals based on an intrinsic aspect of a person and requires the person to be physically present at the point of authentication. These characteristics may overcome the problem of earlier authentication methods, for example password or token-based authentication methods, which can be quite easily compromised. There are many options in biometric technology, including a keystroke biometric, a fingerprint biometric, a retina scan biometric, a palm print biometric, and a face biometric.

In a field of encryption and decryption of information and data, various methods have been proposed and implemented to secure information transmission through communication media. Normally, an application of special purpose software programs may be used for example, to hide underlying contents, to limit access, to inhibit reverse engineering, and to authenticate sources, and other security or secret messaging activities. A cryptosystem may allow the transmission of unintelligible, except for intended receivers, secrets, or other types of messages and information.

There are two general types of cryptographic algorithms in application today: a symmetric algorithm and an asymmetric algorithm. In the symmetric algorithm, an encryption key may be calculated from a decryption key, and vice versa. Typically, the encryption key for the symmetric encryption is the same as the decryption key. In the asymmetric encryption, the keys used for the encryption and the decryption differ in such a way that at least one key is computationally impossible to determine from the other. The keys come in a pair: a public key for the encryption and a private key for the decryption and for the purpose of secrecy and preservation of data integrity, the decryption key is to be kept secret, whereas the public key may be made available to any interested party. The message encrypted by using the public key can only be decrypted by using the corresponding private key. Traditionally, the keys are generated by a password, a token, or a combination thereof. Recently, there have been some attempts to use biometrics for key generation and hence cryptographic applications.

SUMMARY OF THE INVENTION

An exemplary embodiment provides a method for authenticating user through comparison between templates generated based on the matrix multiplication result of a biometric feature vector and a random number matrix.

Another exemplary embodiment provides an apparatus for authenticating user through comparison between templates generated based on the matrix multiplication result of a biometric feature vector and a random number matrix.

According to an exemplary embodiment, a method for authenticating user using biometric information is provided. The authentication method includes: multiplying a first feature vector obtained from first biometric information of the user by a plurality of pseudo-random number (PRN) matrices, respectively; generating query template based on an index of an element having a maximum value among elements of result vector of the multiplication between the first feature vector and the plurality of PRN matrices; and performing authentication for the user by comparing the query template with pre-stored reference template of a subscribed user.

The method may further include: multiplying a second feature vector obtained from second biometric information of the subscribed user by a plurality of PRN matrices, respectively, wherein the second biometric information is generated; and generating the reference template based on an index of an element having a maximum value among elements of result vector of the multiplication between the second feature vector and the plurality of PRN matrices, and storing the reference template.

The performing authentication for the user by comparing the query template with pre-stored reference template of a subscribed user may include: determining that the user of the query template is the same as the subscribed user of the reference template when a number of the elements of the query template which is the same as elements of the reference template is a predetermined number or more.

The query template and the reference template may include an index of an element having a maximum value among elements of the result vector.

The performing authentication for the user by comparing the query template with pre-stored reference template may include: binding a secret key with the reference template; and retrieving the secret key by using the query template.

The binding a secret key with the reference template may include: assigning a reference entry of the reference template to a plurality of vaults; and determining an output entry corresponding to a location index of the reference entry by inputting the location index indicating an assigned location for the reference entry in the plurality of vaults to an unknown number x of a polynomial determined based on the secret key.

The binding a secret key with the reference template may further include: assigning a plurality of chaff entries to a cell in which the reference entry is not assigned in the plurality of vaults; determining a chaff output entry corresponding to a location index of the chaff entry by inputting the location index indicating an assigned location for the chaff entry in the plurality of vaults to an unknown number x of the polynomial; and storing a set Including the reference entry and the output entry and a set including the chaff entry and the chaff output entry as helper data.

The retrieving the secret key using the query template may include: searching for an identical index of an entry identical to the query entry of the query template among entries assigned to the plurality of vaults; determining an output entry corresponding to the identical index from the helper data if the entry identical to the query entry exists; and determining the polynomial based on a pair of the identical index and the output entry.

The retrieving the secret key using the query template may further include: determining coefficients of the polynomial determined based on the pair of the identical index and the output entry as the secret key based on a result of a hash function having the coefficient as inputs.

Each of the plurality of vaults may include at least one mini vault and the at least one mini vault includes a cell to which the reference entry is assigned and a plurality of cells to which the plurality of chaff entries are assigned.

According to another exemplary embodiment, an apparatus for authenticating user using biometric information is provided. The authentication apparatus includes: a processor, a memory, and a biometric sensor used for obtaining the biometric information, the processor executes a program stored in the memory to perform: generating a first feature vector from first biometric information of the user obtained by the biometric sensor and multiplying the first feature vector by a plurality of pseudo-random number (PRN) matrices, respectively; generating query template based on an index of an element having a maximum value among elements of result vector of the multiplication between the first feature vector and the plurality of PRN matrices; and performing authentication for the user by comparing the query template with pre-stored reference template of a subscribed user.

The processor may further perform: generating a second feature vector from second biometric information of the subscribed user obtained by the biometric sensor and multiplying the second feature vector by a plurality of PRN matrices, respectively; and generating the reference template based on an index of an element having a maximum value among elements of result vector of the multiplication between the second feature vector and the plurality of PRN matrices, and storing the reference template.

When the processor performs the performing authentication for the user by comparing the query template with pre-stored reference template of a subscribed user, the processor may perform: determining that the user of the query template is the same as the subscribed user of the reference template when a number of elements which is the same between the query template and the reference template is a predetermined number or more.

The query template and the reference template may include an index of an element having a maximum value among elements of the result vector.

When the processor performs the performing authentication for the user by comparing the query template with pre-stored reference template of a subscribed user, the processor may perform: binding a secret key with the reference template; and retrieving the secret key by using the query template.

When the processor performs binding a secret key with the reference template, the processor may perform: assigning a reference entry of the reference template to a plurality of vaults; and determining an output entry corresponding to a location Index of the reference entry by inputting the location index indicating an assigned location for the reference entry in the plurality of vaults to an unknown number x of a polynomial determined based on the secret key.

When the processor performs binding a secret key with the reference template, the processor may further perform: assigning a plurality of chaff entries to a cell in which the reference entry is not assigned in the plurality of vaults; determining a chaff output entry corresponding to a location index of the chaff entry by Inputting the location index indicating an assigned location for the chaff entry in the plurality of vaults to an unknown number x of the polynomial; and storing a set including the reference entry and the output entry and a set including the chaff entry and the chaff output entry as helper data.

When the processor performs retrieving the secret key by using the query template, the processor may perform: searching for an identical index of an entry identical to the query entry of the query template among entries assigned to the plurality of vaults; determining an output entry corresponding to the identical index from the helper data if the entry identical to the query entry exists; and determining the polynomial based on a pair of the identical index and the output entry.

When the processor performs retrieving the secret key by using the query template, the processor may further perform: determining coefficients of the polynomial determined based on the pair of the identical index and the output entry as the secret key based on a result of a hash function having the coefficient as inputs.

Each of the plurality of vaults may include at least one mini vault and the at least one mini vault includes a cell to which the reference entry is assigned and a plurality of cells to which the plurality of chaff entries are assigned.

DETAILED DESCRIPTION OF THE EMBODIMENTS

Figure 1:
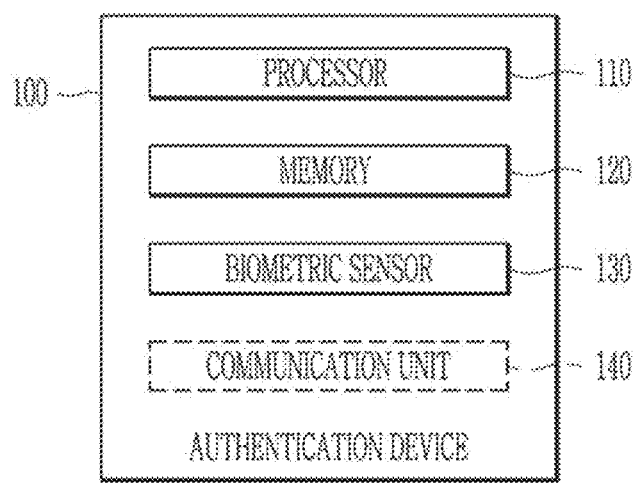
FIG. 1 is a block diagram Illustrating an authentication apparatus according to an exemplary embodiment.

Hereinafter, exemplary embodiments of the present invention will be described in detail with reference to the accompanying drawings so that those skilled in the art may easily practice the present invention. However, the present invention may be modified in various different ways and is not limited to embodiments described herein. In the accompanying drawings, portions unrelated to the description will be omitted in order to obviously describe the present invention, and similar reference numerals will be used to describe similar portions throughout the present specification.

FIG. 1 is a block diagram illustrating an authentication apparatus according to an exemplary embodiment.

Referring to FIG. 1, the authentication device 100 according to an exemplary embodiment includes a processor 110, a memory 120, and a biometric sensor 130. The authentication device 100 according to the exemplary embodiment may include a storage or a display (not shown in the FIG. 1), and the storage may be included in the memory 120. Alternatively, the authentication device 100 according to the exemplary embodiment may further include a communication unit 140 for accessing a wired/wireless network.

The processor 110 may implement functions, processes, or methods proposed by the exemplary embodiment. The memory 120 may be connected to the processor 110 to store various pieces of information for driving the processor 110 or at least one program executed by the processor 110. In addition, the memory 120 may store biometric information input via the biometric sensor 130. The processor 110 may generate a biometric template using the biometric information stored in the memory 120.

The memory 120 may be positioned inside or outside the processor 110, and the memory may be connected to the processor through various already known means. The memory 120 may be various types of volatile or non-volatile storage media. The memory may include a read-only memory (ROM) or a random access memory (RAM).

In addition, the authentication device 100 according to the exemplary embodiment may include an Input device such as a keypad, a keyboard, a mouse, or a pointing device. The display included in the authentication device 100 may be implemented as a touch screen, wherein the display may include a virtual keypad. In general, the authentication device 100 according to the exemplary embodiment may be implemented in a single stand-alone PC, a plurality of PCs, or a server connected to a terminal, a mobile device, and the like.

Figure 2:
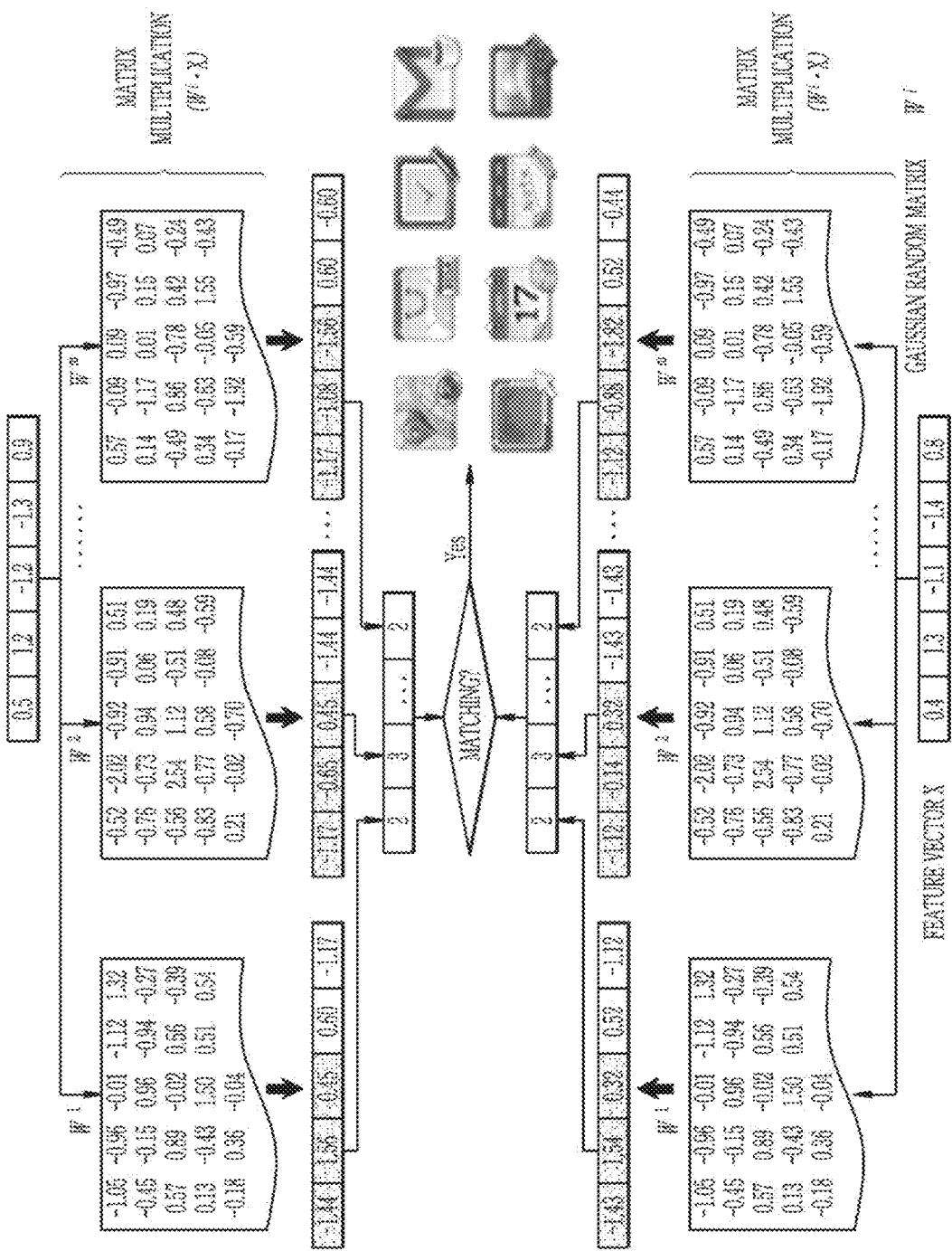
FIG. 2 is a conceptual diagram illustrating an authentication method using the biometric template according to an exemplary embodiment.
Figure 3:
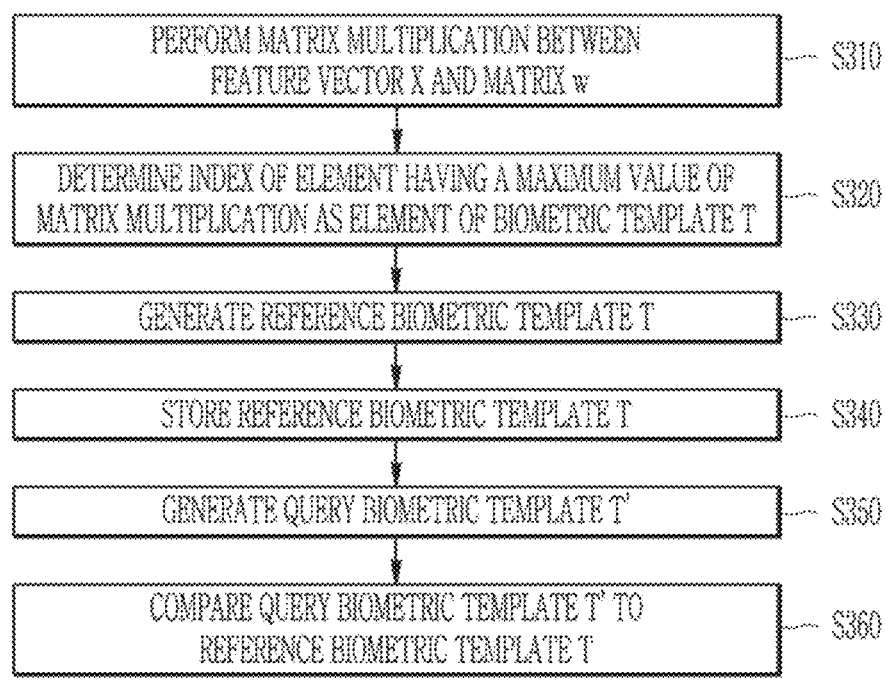
FIG. 3 is a flow chart illustrating the authentication method using the biometric template according to the exemplary embodiment.

FIG. 2 is a conceptual diagram illustrating an authentication method using the biometric template according to an exemplary embodiment, and FIG. 3 is a flow chart illustrating the authentication method using the biometric template according to the exemplary embodiment.

Biometric features having an arbitrary length may be used in the biometric template according to an exemplary embodiment. Alternatively, biometric results from an iris, at least one fingerprint, or a face may be used as the biometric template, and a combination of each biometric result may be used. High dimensional biometric raw data may be converted to feature vectors having a fixed length according to feature transformation. The feature vector is represented by X or Y in this description. This representation may be used as a reference biometric X or as a query biometric Y. The reference biometric X is a biometric for generating a reference template T registered as a criterion for performing various types of authentication. The query biometric Y is a biometric for performing various authentications by comparing with the reference template T, which is generated at the time of various authentications.

According to an exemplary embodiment, the biometric template T is firstly generated based on an operation of a tokenized pseudo-random number (PRN) matrix w and the reference biometric X (or the query biometric Y).

Elements of the PRN matrix w may be distributed according to the Gaussian distribution N(0, 1). Referring to FIG. 2, the matrix multiplication operation is performed on the PRN matrix w and the reference biometric X (or query biometric Y). Then, the reference biometric template T (or the query biometric template T) is generated from the result of the matrix multiplication operation.

According to the exemplary embodiment, the PRN matrix w may be generated by arbitrary PRN generating means, such as a USB token or a smart card. Alternatively, in a specific application, w may be computed by the arbitrary PRN generating means based on a seed stored in the microprocessor of the USB token or the smart card. The seed may be the same among other users during registration, but may be different for each user and application. According to another exemplary embodiment, a known pseudo-random number/random bit generation device or algorithm such as a PRN generator like an ad-hoc ANSI X9.17 generator or a FIPS 186 generator, and a highly secure method such as a cryptographically secure pseudo random generator (CSPBG)—RSA pseudo-random bit generator, a Micali-Schnorr pseudorandom bit generator, or a Blum-Blum-Shub pseudo random bit generator, may be used. Then, the processing steps for generating the biometric template T are repeatedly performed to be used for comparison for allowing access to the computer system before the final template is stored. The PRN is the same for users recorded during the registration, and may be different among different users and different applications.

According to an exemplary embodiment, the reference biometric X may be defined as Equation 1.

$$X \in \mathbb{R}^d \quad \text{[Equation 1]}$$

In Equation 1, d represents a dimension of the feature vector X. Then, a PRN matrix $w^i$ generated by the RPN generation device is given by Equation 2.

$$\{w^i \in \mathbb{R}^d | i=1 \ldots, m\} \quad \text{[Equation 2]}$$

Referring to FIG. 2, the feature vector X is a 5×1 vector and $w^i$ is a 5×5 matrix. When matrix multiplication is performed on the feature vector X and the PRN matrix w (S310), $t_i$ is derived for each PRN matrix $w^i$. $t_i$ may be expressed by Equation 3.

$$t_i = \mathrm{argmax}\langle w^i, X\rangle \text{ where } i=1 \ldots, m \quad \text{[Equation 3]}$$

The $t_i$ is an element of the biometric template T. According to the exemplary embodiment, based on the result of the matrix multiplication operation for the feature vector X and the PRN matrix w, an index of an element having the maximum value is determined as the element $t_1$ of the biometric template T (S320).

Referring to FIG. 2, the result of the matrix multiplication operation on the feature vector X and the PRN matrix w, is {−1.44, 1.56, 0.45, 0.60, −1.17}, and the index 2 of the maximum value 1.56 is determined as the first element $t_1$ of the biometric template T. When 2 is selected as $t_1$, a window of size 3 is applied. According to the exemplary embodiment, when the length of the feature vector X is relatively long, a window may be used to quickly determine $t_i$ based on the matrix multiplication result. The size of the window may be determined according to the length of the feature vector X. The last element $t_m$ of the biometric template T is 2 because the maximum value of the matrix multiplication result is 0.60, but the maximum value in the window of size 3 is −1.08 of index 2.

Then, the biometric template T is generated based on the matrix multiplication of the feature vector X and m PRN matrices (S330), and Equation 4 represents the generated biometric template T.

$$T=[t_i \in [1,q] i=1, \ldots, m] \qquad \text{[Equation 4]}$$

The biometric template T may be stored in a central database or external token during the registration process (S340).

Meanwhile, the query biometric template T' is also generated in the same manner as the biometric template T (S350). That is, a matrix multiplication operation is performed on the feature vector X' generated from the user's biometric at the time of authentication and the PRN matrix w, and the index of the element having the maximum value among the result of the matrix multiplication operation may be determined as an element of the query biometric template T'.

Thereafter, during the authentication process, the query biometric template T is compared with the reference biometric template T (S360). At this time, the comparison of the query biometric template T' and the reference biometric template T may be performed by a method of counting the difference between elements. For example, when the number of the elements of the query biometric template T' which is the same as the elements of the reference biometric template T is a predetermined number or more, it may be determined that the user of the query biometric template T' is the same as the user of the reference biometric template T.

As described above, according to the exemplary embodiment, by generating the biometric template for authentication using the index of the element having the maximum value in the matrix multiplication on the biometric feature vector and the random number matrix, even if the biometric metric is weak and subtle, the user may be successfully authenticated.

In a so-called 'stolen token scenario', a thief can steal victim A's pseudo-random number and impersonate A to attempt authentication. If this situation (the stolen token scenario) occurs, the performance of a system to which the biometric system according to the exemplary embodiment is not applied can be considerably deteriorated. However, by using the biometric template generated by the authentication apparatus according to the exemplary embodiment, the user authentication performance is not significantly affected even in the stolen token scenario.

According to an exemplary embodiment, the input biometric data is converted into a biometric template by using a token or a random number stored in a central database. Then, the proximity of the match of the two templates is determined based on the comparison between the pre-stored biometric template and the biometrics template generated at the time of authentication, and the authentication result of the user may be output according to the determination result of the proximity of the match. Alternatively, according to another exemplary embodiment, the template may be stored in an offline token during the registration, and the template stored in the offline token may be used as a basis for the user authentication. Even if the token storing the template is lost or stolen, the template may be replaced by the method described in FIG. 2.

Table 1 shows performance evaluation of the authentication system using the biometric template according to an exemplary embodiment.

TABLE 1

| METHOD | | | | | | |
|---|---|---|---|---|---|---|
| | FGC2002 | | | FVC2004 | | |
| | DB1 | DB2 | DB3 | DB1 | DB2 | DB3 |
| EER performance without the method according to the exemplary embodiment | | | | | | |
| | 0.20% | 0.19% | 2.30% | 4.70% | 3.13% | 2.80% |
| EER performance with the method according to the exemplary embodiment | | | | | | |
| Stolen Token Case | 0.22% | 0.47% | 3.07% | 4.74% | 4.10% | 3.99% |
| Authentic Token Case | 0.16% | 0.45% | 2.51% | 1.15% | 2.36% | 2.70% |

Two fingerprint databases, FVC 2002 and FVC 2004, have been used to evaluate the performance of the authentication system according to an exemplary embodiment. Each of FVC2002 and FVC2004 provides four fingerprint databases. DB1, DB2, and DB3 include data collected by various sensors, such as low cost, high quality, optical, and capacitive sensors, and DB4 includes a synthesized generated image. Each data set of FVC 2002 and FVC 2004 includes a total of 800 fingerprint data obtained from 100 different fingers (8 fingerprints 100 different fingers). An FAR test and an FRR test have been performed for the performance evaluation. The FAR test and the FRR test may be performed by Equation 5.

$$FAR = \frac{\text{Number of requests from access thief}}{\text{Number of requests from thief}} \qquad \text{[Equation 5]}$$

$$FRR = \frac{\text{Number of denied authentic requests}}{\text{Total number of authentic requests}}$$

The EER is the average of the FAR and the FRR, as shown in Equation 6.

$$EER = \frac{FAR + FRR}{2} \qquad \text{[Equation 6]}$$

Figure 4:
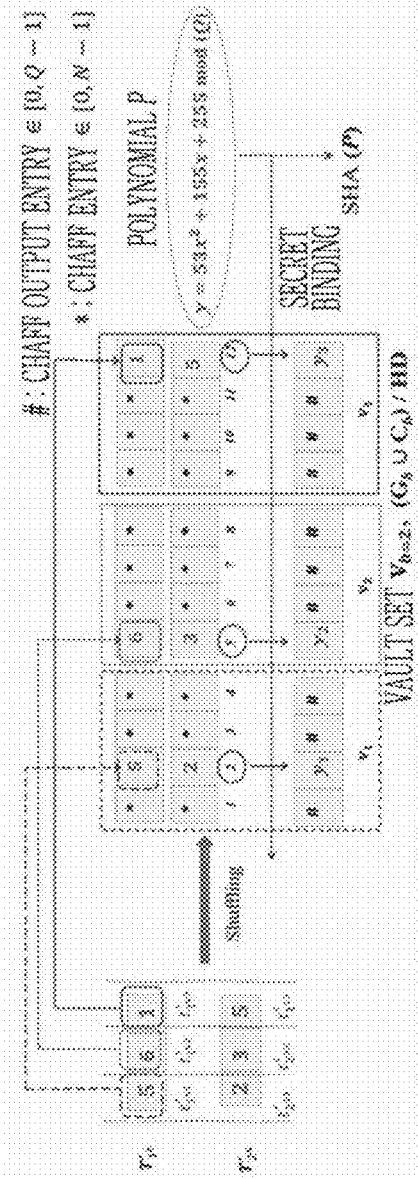
FIG. 4 is a conceptual diagram illustrating an authentication method using a biometric template according to another exemplary embodiment.
Figure 4:
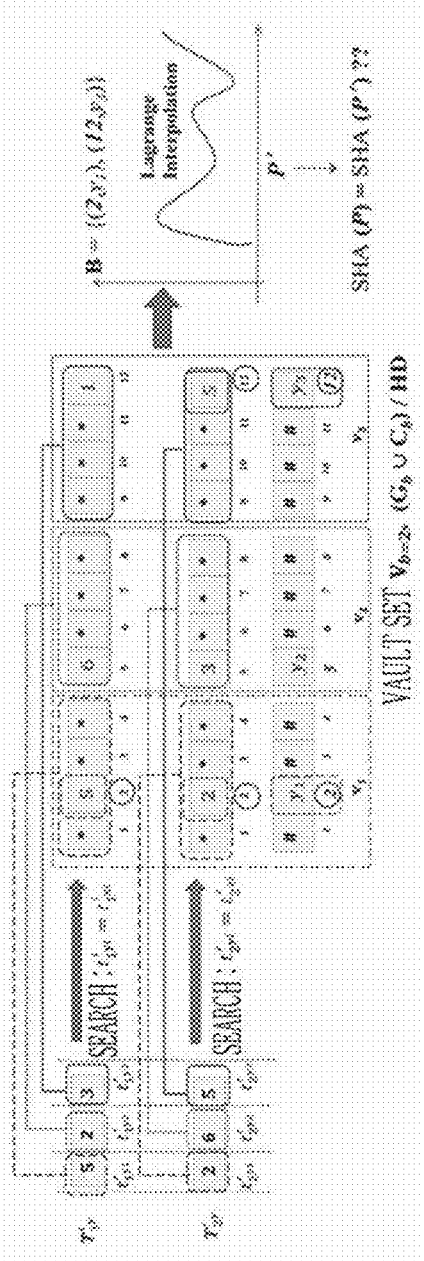
Figure 5:
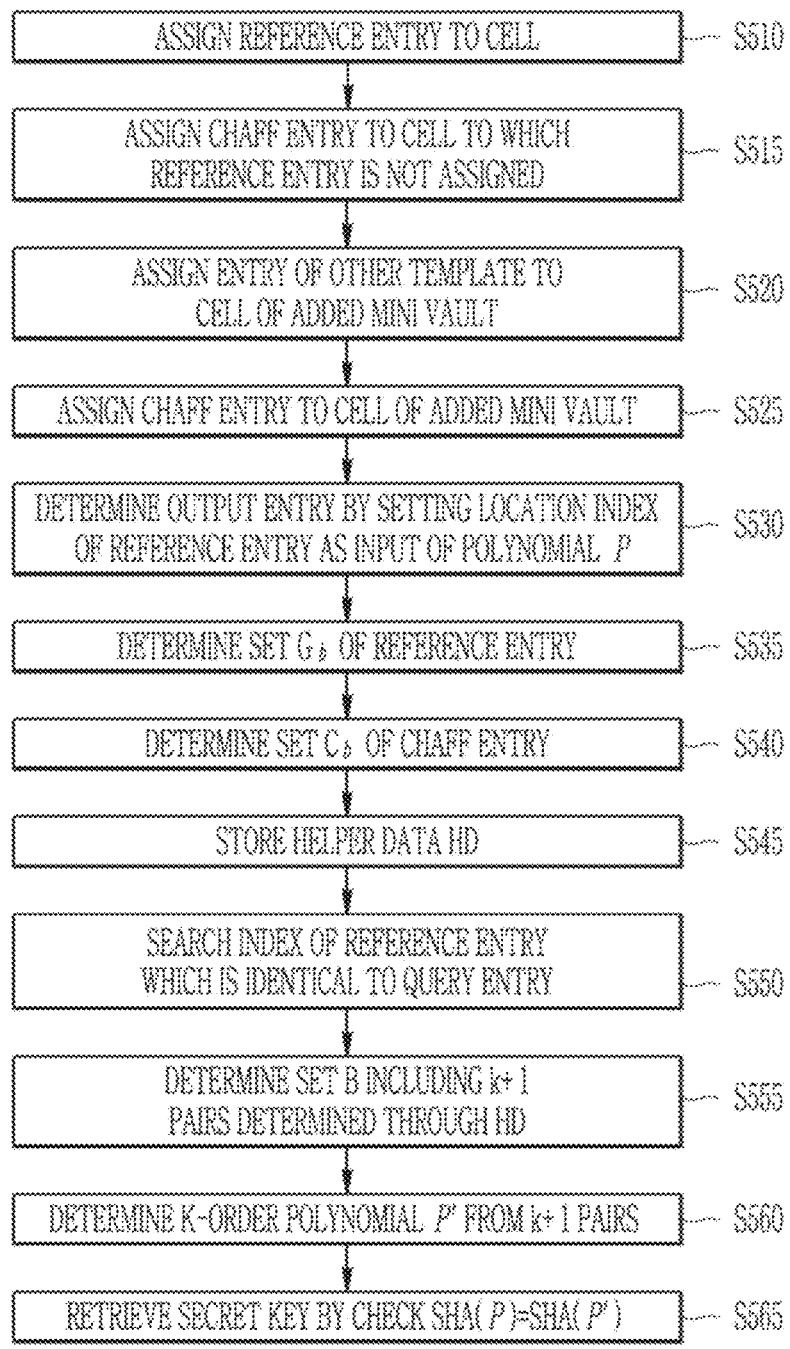
FIG. 5 is a flowchart illustrating an authentication method using a biometric template according to another exemplary embodiment.

FIG. 4 is a conceptual diagram illustrating an authentication method using a biometric template according to another exemplary embodiment, and FIG. 5 is a flowchart Illustrating an authentication method using a biometric template according to another exemplary embodiment.

According to another exemplary embodiment, the biometric template T may be combined with a secret key for using associated with a cryptographic and cryptographic application, and the biometrics template T at the time of authentication may be used to retrieve the secret key. The secret key according to an exemplary embodiment may include a private key of a symmetric cryptosystem, a public key of an asymmetric cryptosystem, a message hash of a digital signature, a transaction disposable pad, and the like. Another exemplary embodiment may be based on Shamir's secret sharing scheme. The Shamir's secret sharing scheme involves two stages: a secret binding stage and a secret retrieval stage. In the secret binding stage, the secret key is encoded into a coefficient of a finite field polynomial P(x) of degree k, and then the encoded secret key is combined with the biometric template. Genuine shares are represented by points (x, P(x)), defined as the element x in the biometric set, and are known as a genuine set G with a total number of elements of t. Thereafter, a set C ((a, b)∈C) of chaff points which do not lie on the function P(x) is randomly generated. The union set of G and C forms a vault V. The secret key in the secret retrieval stage may be retrieved by identifying the possible k+1 of t genuine points based on the query biometric set, and then determining the coefficients through polynomial reconstruction.

First, the secret binding stage is described.

The biometric template $T_X$ generated from the biometric feature vector X is registered, and the entry $t_{Xi}$ of the registered biometric template $T_X$ may be expressed by Equation 7.

$$[t_{Xi} \in [1,q] | i=1, \ldots, m] \quad \text{[Equation 7]}$$

Further, $t_{Xi}$ may be converted to $t'_{Xi}$ by the following Equation 8.

$$t'_{Xi} = (t_{Xi} + r_i) \bmod N \text{ where } r_i \in [1,N] \quad \text{[Equation 8]}$$

In Equation 8, $r_i$ is a random integer. Then, if N>>q, the following Equation 9 is derived.

$$T'_X = [t'_{Xi} \in [0, N-1] | i=1, \ldots, m] \quad \text{[Equation 9]}$$

According to the procedure of Equations 7 to 9 above, the range of each entry is extended from q to N which is a very large number, and the collision probability of entries in $T_X$ may be effectively reduced. By doing this, more chaff entries in the range [0, N−1] may be added during the secret binding stage to minimize collisions between chaff entry and genuine entry in the secret retrieval stage. According to the exemplary embodiment, the secret binding stage includes the following two steps.

Step 1: The reference entry $t'_{Xi}$ of the reference biometric template $T'_X$ is randomly allocated to cells included in m slots (S510). Each slot contains v cells, and each cell is called a primary mini vault. Each basic mini vault is located within the vault. The primary mini vault $v_i$ may be expressed according to Equation 10.

$$\{v_i = 1, \ldots, m\} \quad \text{[Equation 10]}$$

Referring to FIG. 4, (5, 6, 1) of entry $T'_{1X}$ are assigned to a second cell of a primary mini vault in the first vault, a first cell of a primary mini vault in the second vault, and a fourth cell of a primary mini vault in the third vault, respectively.

Then, a chaff entry is assigned to v−1 cells in the slot to which the next entry $t'_{Xi}$ is not assigned (S515). Equation 11 represents the chaff entry.

$$\{c_{j(i)} \in [0, N-1] | j=1, \ldots, v-1, i=1, \ldots, m\} \quad \text{[Equation 11]}$$

An entry of another template $T'_X$ generated from the same biometric feature vector is assigned to b added mini vault $v_{ib}$ (S520), and a chaff entry is also assigned to the added mini vault (S525). Steps S520 and S525 may be performed by using different sets of tokenized PRNs. For each added mini vault $v_{ib}$, the deployment of the entry $t'_{Xi}$ follows the primary mini vault. That is, the position of all entries $t'_X$ is the same in all mini vaults. Since each entry $t'_{Xi}$ and chaff entry $c_j(i)$ is shuffled to ensure that it is randomly and uniformly positioned over all mini vaults $v_{ib}$, it is difficult to distinguish the chaff entry and the entry $t'_{Xi}$ within the vault or the mini vault.

Referring to FIG. 4, (2, 3, 5) of entry $T_{2X}$ are assigned to a second cell of an added mini vault in the first vault, a first cell of an added mini vault in the second vault, and a fourth cell of an added mini vault in the third vault, respectively.

That is, the number of the cell to which the entry $T_{2X}$ is assigned in each added mini vault is the same as the primary mini vault.

Step 2: Define a location index of the set of mini vaults including v slots as E. E which represents the location index may be defined as Equation 12.

$$E = \{1, \ldots, mv\} \quad \text{[Equation 12]}$$

That is, the location index may indicate the location where the entry $t'_{Xi}$ is assigned within the vault. Referring to FIG. 4, for one entry, the number m of vaults is 3, and the number v of cells included in the mini vault in each vault is 4, so that the location index E is one of 1 to 12. In the shuffling process of the entry $t'_{Xi}$ and the chaff entry, the location of the entry $t'_{Xi}$ may be determined to be A(A ⊂ E). Referring to FIG. 4, the location A of the entry $t'_{Xi}$ is (2, 5, 12). At this time, the location index of t' is input to the polynomial P as the unknown number x of the finite field polynomial P of degree k (S530), and the output entry y corresponding to the reference entry is determined. Here, the coefficient of the polynomial P is a secret key encoded into the polynomial P. Referring to FIG. 4, the secret key encoded into the quadratic polynomial P, that is, the coefficients of each term of the quadratic polynomial P, is (53, 155, 255). Therefore, the location index $idxt'_{Xi}$ ($idxt'_{Xi} \in A$) of $t'_{Xi}$ is embedded in P, and the following Equation 13 is expressed.

$$[y_i = P(idxt'_{Xi}) \bmod(Q) \in \mathbb{Z}_Q | i=1, \ldots, m] \quad \text{[Equation 13]}$$

In Equation 13, Q is a relatively large prime number, and, in an exemplary embodiment, Q is 89989. The pair of the reference entry $t'_{Xi}$ and the corresponding embedded entry $y_i$ is determined to be the original set $G_b$(S535), and $G_b$ is shown in Equation 14 below $$G_b = [(idxt'_{Xi}, y_i) | i=1, \ldots, m] \quad \text{[Equation 14]}$$

Although a plurality of mini vaults are introduced in step 1, since the locations of $t'_{Xi}$ are the same for all mini vaults, only one $G_b$ may exist. That is, referring to FIG. 4, $G_b$ according to the polynomial $P(y=53x^2+155x+255)$ is [(2, 777) (5,2355) (12,9747)]. The same procedure is also performed for the chaff entry q(i), $y_j$(i) corresponds to the chaff entry, and the chaff entry pair $c_b$ may be expressed by Equation 15 (S540).

$$C_b = \{(c_{j(i)}, y_{j(i)}) | y_{j(i)} \neq y_i, i=1, \ldots, m, j=1, \ldots, v-1\} \quad \text{[Equation 15]}$$

The value of Q (Q>m(v−1)) may be limited to ensure that the corresponding chaff is not repeated with respect to security. The union $V_b(V_b = G_b \cup C_b)$ of the original and the chaff corresponding to the original is stored as Helper Data (HD) (S545). Finally, P is hashed through a standard message hash function such as SHA-1, and the hash result of P, SHA(p), is stored with the HD in the secret binding stage.

The following describes the secret retrieval stage.

In order for the secret key to be retrieved in the secret retrieval stage, the entry pair corresponding to the entry $t'_{yi}$ according to the query biometric template needs to be determined and the polynomial P from the determined entry pair need to be reconstructed as the polynomial P'.

First, ab-th (b≥1) query biometric template $T'_b{}^n$ may be defined as shown in Equation 16.

$$T'_b{}^n \in [1,q]^m \quad \text{[Equation 16]}$$

Then, the same expansion operation as that of the secret binding stage is performed as shown in Equation 17 to calculate Equation 18.

$$t'_b{}^n = (t_{bYi} + r_i) \quad \text{[Equation 17]}$$

$$[t'_b{}^n \in [0, N-1] | i=1, \ldots, m] \subset T'_b{}^r \quad \text{[Equation 18]}$$

Step 1: When the reference entry $t'_{xi}$ and the query entry $t'_{yi}$ of the query template $T'_y$ are matched at each mini vault $v_b$, an index of $t'_y$ which is identical to $t'_{xi}$ is searched (S550). If a match exists in the $v_b$, a set B including pairs which include output entry is determined through the HD (S555). Referring to FIG. 4, since the first entry $t'_{b,y1}$ of the template $T'_{1y}$ is identical to $t'_{1x1}$ and the first entry $t'_{2y1}$ of the template $T'_{2y}$ is identical to $t'_{2x1}$, $y_1(777)$ corresponding to index 2 may be determined through the HD. Referring to FIG. 4, since the third entry $t'_{2y3}$ of the template $T'_{2y}$ is identical to $t'_{2x3}$, $y_3(9747)$ corresponding to Index 12 may be determined through the HD. B including the pairs of entries may be expressed as shown in Equation 19.

$$B=[(x(t'_b{}^{xi}=t'_b{}^n),y(t'_b{}^{xi}=t'_b{}^n))|i=1,\ldots,m]  \quad \text{[Equation 19]}$$

In Equation 19, x and y are respectively given by Equation 20.

$$x \in E$$
$$y \in \mathbb{Z}_Q \quad \text{[Equation 20]}$$

Referring to FIG. 4, indices 2 and 12 of cells including the same entries as T'1y (5, 2, 3) and T2y are determined. In the second vault, there is no cell including the same entry despite two query templates T1y and T2y. Thus, since B corresponding to the two query entries is $\{(2, y_1), (12, y_3)\}$ and the quadratic polynomial P' is not specified from B having two pairs, the authentication using the two query templates $T_{1y}$ and $T_{2y}$ fails. That is, the two query templates $T'_{1y}$ and $T_{2y}$ may not be determined to be generated from the same user as the templates $T'_{1x}$ and $T'_{2x}$.

Step 2: For B, a k-th order polynomial P' may be determined from k+1 pairs included in B (S560). Thereafter, if SHA (P)=SHA (P'), the secret key is retrieved (S565). That is, if B including three pair encryption s is determined from the two query templates $T'_{1x}$ and $T'_{1y}$ (B=$\{(2,y_1),(5,y_2),(12,y_3)\}$, the polynomial P' may be specified from B, and SHA(P') having the same result as SHA(P) may be obtained. At this time, the coefficient of the polynomial P' is a secret key.

If there are 2 or 6 in cell 6, cell 7, or cell 8 of the mini vault of the second vault, the chaff output entry corresponding to the chaff entry may be determined. That is, if the query entry is identical to the number assigned to the cells in the vault, B=$\{(2,y_1),(6,y_2),(12,y_3)\}$, B=$(\{(2,y_1),(7,y_2),(12,y_3)\}$, or B=$\{(2,y_1),(8,y_2),(12,y_3)\}$ may be determined. In this case, the quadrature polynomial P' may be reconstructed from B having three pairs, but also the secret key may not be retrieved since SHA(P)=SHA(P') is not established.

As described above, the advantage of the biometric template according to an exemplary embodiment may be utilized for the security of the private key, the public key of the cryptographic system, and the like through the combination of the biometric template and the secret key. The authentication apparatus according to the exemplary embodiment may be applied to various applications. For example, the authentication apparatus may be used for computerized access control facilities, access to computer systems, encryption applications, and the like. When the authentication apparatus according to the exemplary embodiment includes an input device such as a biometric sensor, the user may not be aware that his or her biological characteristics are being measured or analyzed since the authentication apparatus according to the exemplary embodiment is integrated into another typical computer device.

By generating a biometric template for authentication using the index of the element having the maximum value in the matrix multiplication of the biometric feature vector and the random number matrix, the user can be successfully authenticated even in a slight and subtle change of the biometric. In addition, the combination of the biometric template and the secret key can be used to secure the security of the private key and the public key of the cryptographic system.

Figure 6:
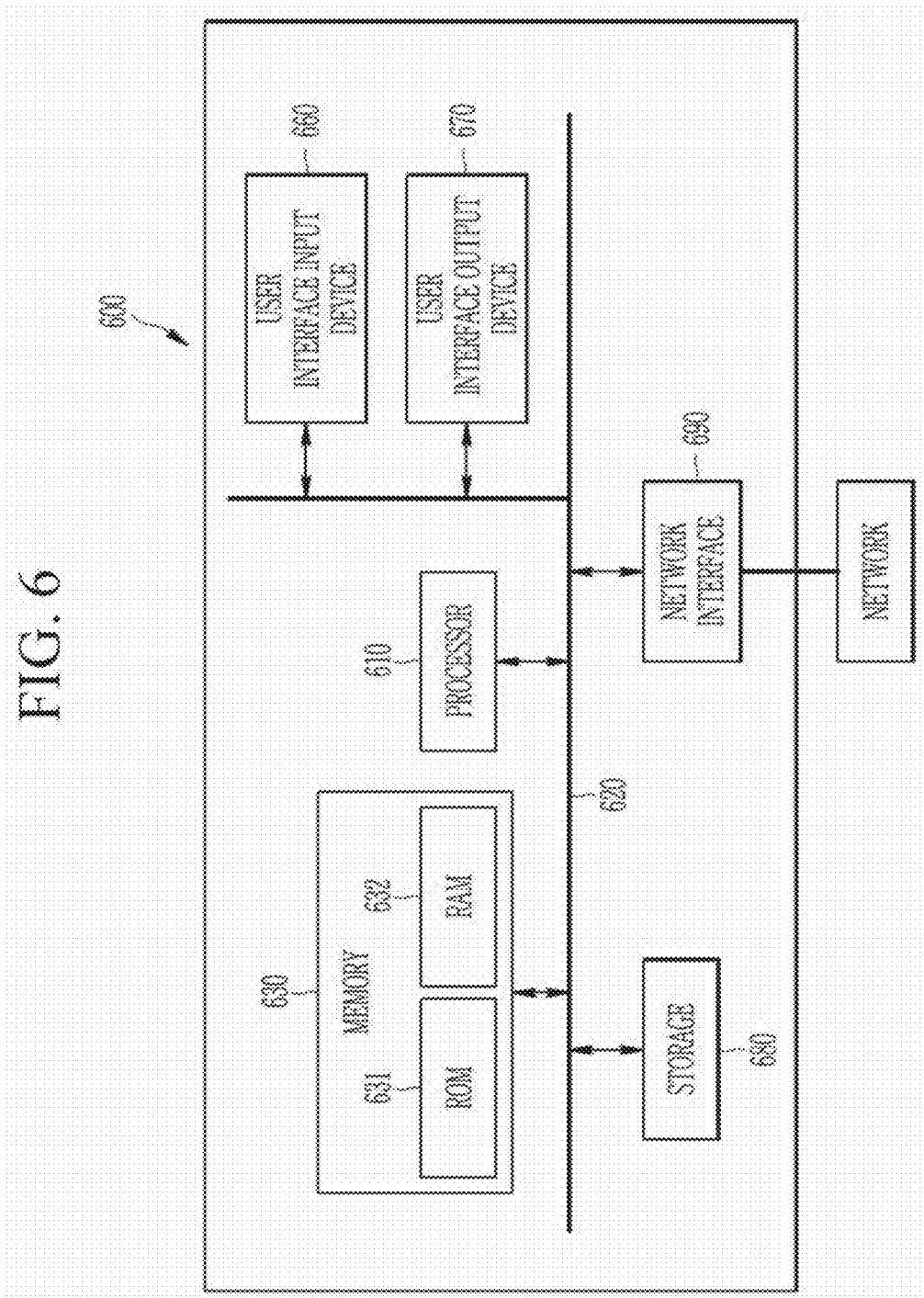
FIG. 6 is a block diagram illustrating an authentication apparatus according to another exemplary embodiment.

FIG. 6 is a block diagram illustrating an authentication apparatus according to another exemplary embodiment.

An authentication apparatus according to another exemplary embodiment may be implemented as a computer system, e.g., a computer readable medium. Referring to FIG. 6, the computer system 600 may include at least one of a processor 610 communicating via a bus 620, a memory 630, a user interface input device 660, a user interface output device 670, and a storage 680. The computer system 600 also may include a network Interface 690 coupled to the network. The processor 610 may be a central processing unit (CPU) or a semiconductor device that executes instructions stored in the memory 630 or the storage device 680. The memory 630 and the storage device 680 may include various forms of volatile or non-volatile storage media. For example, the memory 630 may include a read only memory (ROM) 631 and a random access memory (RAM). Thus, the exemplary embodiments may be implemented as a computer-implemented method or as a non-volatile computer-readable medium having computer-executable instructions stored thereon. In an exemplary embodiment, when executed by a processor, the computer-readable instructions may perform the method according to at least one aspect of the present disclosure. While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A method for authenticating user using biometric information, comprising:

multiplying a first feature vector obtained from first biometric information of the user by a plurality of pseudo-random number (PRN) matrices, respectively;

generating a query template based on an index of an element having a maximum value among elements of a result vector of the multiplication between the first feature vector and the plurality of PRN matrices; and performing authentication for the user by comparing the query template with a pre-stored reference template of a subscribed user, wherein the performing authentication for the user by comparing the query template with the pre-stored reference template comprises binding a secret key with the reference template, wherein the binding the secret key with the reference template comprises:

assigning a reference entry of the reference template to a plurality of vaults, each of the plurality of vaults including at least one mini vault, and the at least one mini vault including a cell to which the reference entry is assigned; and determining an output entry corresponding to a location index of the reference entry by inputting the location index indicating an assigned location for the reference entry in the plurality of vaults to an unknown number x of a polynomial determined based on the secret key.

2. The method of claim 1, further comprising:
multiplying a second feature vector obtained from second biometric information of the subscribed user by a plurality of PRN matrices, respectively, wherein the second biometric information is generated; and
generating the reference template based on an index of an element having a maximum value among elements of a result vector of the multiplication between the second feature vector and the plurality of PRN matrices, and storing the reference template.

3. The method of claim 1, wherein the performing authentication for the user by comparing the query template with a pre-stored reference template of a subscribed user comprises:
determining that the user of the query template is the same as the subscribed user of the reference template when a number of the elements of the query template which is the same as elements of the reference template is a predetermined number or more.

4. The method of claim 2, wherein the query template and the reference template include an index of an element having a maximum value among elements of the result vector.

5. The method of claim 2, wherein the performing authentication for the user by comparing the query template with pre-stored reference template further comprises retrieving the secret key by using the query template.

6. The method of claim 1, wherein the binding a secret key with the reference template further comprises:
assigning a plurality of chaff entries to a cell in which the reference entry is not assigned in the plurality of vaults;
determining a chaff output entry corresponding to a location index of the chaff entry by inputting the location index indicating an assigned location for the chaff entry in the plurality of vaults to an unknown number x of the polynomial; and
storing a set including the reference entry and the output entry and a set including the chaff entry and the chaff output entry as helper data.

7. The method of claim 6, wherein the retrieving the secret key using the query template comprises:
searching for an identical index of an entry identical to the query entry of the query template among entries assigned to the plurality of vaults;
determining an output entry corresponding to the identical index from the helper data if the entry identical to the query entry exists; and
determining the polynomial based on a pair of the identical index and the output entry.

8. The method of claim 7, wherein the retrieving the secret key using the query template further comprises:
determining coefficients of the polynomial determined based on the pair of the identical index and the output entry as the secret key based on a result of a hash function having the coefficient as inputs.

9. The method of claim 6, wherein the at least one mini vault further includes a plurality of cells to which the plurality of chaff entries are assigned.

10. An apparatus for authenticating user using biometric information, comprising:
a processor, a memory, and a biometric sensor used for obtaining the biometric information,
wherein the processor executes a program stored in the memory to perform:
generating a first feature vector from first biometric information of the user obtained by the biometric sensor and multiplying the first feature vector by a plurality of pseudo-random number (PRN) matrices, respectively;
generating a query template based on an index of an element having a maximum value among elements of a result vector of the multiplication between the first feature vector and the plurality of PRN matrices; and
performing authentication for the user by comparing the query template with a pre-stored reference template of a subscribed user,
wherein the performing authentication for the user by comparing the query template with the pre-stored reference template comprises binding a secret key with the reference template,
wherein the binding the secret key with the reference template comprises:
assigning a reference entry of the reference template to a plurality of vaults, each of the plurality of vaults including at least one mini vault, and the at least one mini vault including a cell to which the reference entry is assigned; and
determining an output entry corresponding to a location index of the reference entry by inputting the location index indicating an assigned location for the reference entry in the plurality of vaults to an unknown number x of a polynomial determined based on the secret key.

11. The apparatus of claim 10, wherein the processor further performs:
generating a second feature vector from second biometric information of the subscribed user obtained by the biometric sensor and multiplying the second feature vector by a plurality of PRN matrices, respectively; and
generating the reference template based on an index of an element having a maximum value among elements of result vector of the multiplication between the second feature vector and the plurality of PRN matrices, and storing the reference template.

12. The apparatus of claim 10, wherein when the processor performs the performing authentication for the user by comparing the query template with a pre-stored reference template of a subscribed user, the processor performs:
determining that the user of the query template is the same as the subscribed user of the reference template when a number of elements which is the same between the query template and the reference template is a predetermined number or more.

13. The apparatus of claim 11, wherein the query template and the reference template include an index of an element having a maximum value among elements of the result vector.

14. The apparatus of claim 11, wherein when the processor performs the performing authentication for the user by comparing the query template with pre-stored reference template of a subscribed user, the processor further performs retrieving the secret key by using the query template.

15. The apparatus of claim 10, wherein when the processor performs binding a secret key with the reference template, the processor further performs:
assigning a plurality of chaff entries to a cell in which the reference entry is not assigned in the plurality of vaults;
determining a chaff output entry corresponding to a location index of the chaff entry by inputting the location index indicating an assigned location for the chaff entry in the plurality of vaults to an unknown number x of the polynomial; and storing a set including the reference entry and the output entry and a set including the chaff entry and the chaff output entry as helper data.

16. The apparatus of claim 15, wherein when the processor performs retrieving the secret key by using the query template, the processor performs:
searching for an identical index of an entry identical to the query entry of the query template among entries assigned to the plurality of vaults;
determining an output entry corresponding to the identical index from the helper data if the entry identical to the query entry exists; and
determining the polynomial based on a pair of the identical index and the output entry.

17. The apparatus of claim 16, wherein when the processor performs retrieving the secret key by using the query template, the processor further performs:
determining coefficients of the polynomial determined based on the pair of the identical index and the output entry as the secret key based on a result of a hash function having the coefficient as inputs.

18. The apparatus of claim 15, wherein the at least one mini vault further includes a plurality of cells to which the plurality of chaff entries are assigned.

* * * * *